(12) United States Patent
Galpin et al.

(10) Patent No.: US 12,526,420 B2
(45) Date of Patent: Jan. 13, 2026

(54) MOTION VECTOR PREDICTION IN VIDEO ENCODING AND DECODING

(71) Applicant: INTERDIGITAL CE PATENT HOLDINGS, SAS, Paris (FR)

(72) Inventors: Franck Galpin, Thorigne-Fouillard (FR); Fabrice Leleannec, Betton (FR); Antoine Robert, Mézières sur Couesnon (FR); Tangi Poirier, Thorigné-Fouillard (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 220 days.

(21) Appl. No.: 17/620,402

(22) PCT Filed: Jun. 23, 2020

(86) PCT No.: PCT/EP2020/067497
§ 371 (c)(1),
(2) Date: Dec. 17, 2021

(87) PCT Pub. No.: WO2020/260280
PCT Pub. Date: Dec. 30, 2020

(65) Prior Publication Data
US 2023/0018401 A1 Jan. 19, 2023

(30) Foreign Application Priority Data

Jun. 25, 2019 (EP) .................... 19305833

(51) Int. Cl.
*H04N 19/13* (2014.01)
*H04N 19/105* (2014.01)
(Continued)

(52) U.S. Cl.
CPC ........... *H04N 19/13* (2014.11); *H04N 19/105* (2014.11); *H04N 19/139* (2014.11);
(Continued)

(58) Field of Classification Search
CPC .... H04N 19/13; H04N 19/105; H04N 19/139; H04N 19/159; H04N 19/172;
(Continued)

(56) References Cited

U.S. PATENT DOCUMENTS

| 9,930,363 | B2 | 3/2018 | Rusanovskyy et al. |
| 10,148,977 | B2 | 12/2018 | Yu et al. |

(Continued)

FOREIGN PATENT DOCUMENTS

| CN | 105308965 A | 2/2016 |
| CN | 107534711 A | 1/2018 |

(Continued)

OTHER PUBLICATIONS

Galpin et al., "CE4-related: simplified constructed temporal affine merge candidates", Joint Video Experts Team (JVET) of ITU-T SG16 WP3 and ISO/IEC JTC 1/SC 29/WG11, Document: JVET-L0522-v2, 12th Meeting: Macao, China, Oct. 3, 2018, 4 pages.

(Continued)

*Primary Examiner* — Farzana Hossain
(74) *Attorney, Agent, or Firm* — Condo Roccia Koptiw LLP

(57) ABSTRACT

A video codec can involve encoding and decoding picture information and first and second flags, wherein the encoding or decoding of the picture information is based on a coding mode indicated by the first flag or the second flag, and the first flag indicates a subblock merge mode and the second flag indicates an inter affine prediction mode, and the encoding or decoding of the first flag uses Context-Based Adaptive Binary Arithmetic Coding (CABAC) based on a first probability model and encoding or decoding of the second flag uses CABAC based on a second probability model.

19 Claims, 17 Drawing Sheets

(51) Int. Cl.
  *H04N 19/139* (2014.01)
  *H04N 19/159* (2014.01)
  *H04N 19/172* (2014.01)
  *H04N 19/176* (2014.01)
  *H04N 19/52* (2014.01)
  *H04N 19/70* (2014.01)

(52) U.S. Cl.
  CPC ......... *H04N 19/159* (2014.11); *H04N 19/172* (2014.11); *H04N 19/176* (2014.11); *H04N 19/52* (2014.11); *H04N 19/70* (2014.11)

(58) Field of Classification Search
  CPC ...... H04N 19/176; H04N 19/52; H04N 19/70; H04N 19/109; H04N 19/119; H04N 19/103; H04N 19/463; H04N 19/537; H04N 19/91; H04N 19/147; H04N 19/184; H04N 19/44; H04N 19/527
  See application file for complete search history.

(56) References Cited

U.S. PATENT DOCUMENTS

| | | | |
|---|---|---|---|
| 11,438,578 | B2 | 9/2022 | Chen et al. |
| 12,069,239 | B2 * | 8/2024 | Zhang .................. H04N 19/159 |
| 2013/0003827 | A1 | 1/2013 | Misra et al. |
| 2014/0029670 | A1 | 1/2014 | Kung et al. |
| 2017/0332095 | A1 | 11/2017 | Zou et al. |
| 2020/0288141 | A1 | 9/2020 | Chono |
| 2021/0160533 | A1 * | 5/2021 | Zhang .................. H04N 19/176 |
| 2021/0392329 | A1 * | 12/2021 | Galpin .................. H04N 19/172 |
| 2022/0053204 | A1 * | 2/2022 | Laroche ................. H04N 19/54 |
| 2022/0070444 | A1 * | 3/2022 | Takehara ............. H04N 19/157 |
| 2022/0086433 | A1 * | 3/2022 | Zhang .................. H04N 19/137 |
| 2023/0396775 | A1 * | 12/2023 | Park ..................... H04N 19/137 |

FOREIGN PATENT DOCUMENTS

| | | |
|---|---|---|
| CN | 109547790 A | 3/2019 |
| JP | 2022-511637 A | 2/2022 |
| RU | 2645270 C1 | 2/2018 |
| WO | 2014/120721 A1 | 8/2014 |
| WO | 2019/069602 A1 | 4/2019 |
| WO | 2020/085953 A1 | 4/2020 |
| WO | WO 2020077003 A1 | 4/2020 |

OTHER PUBLICATIONS

Chen et al., "Context Reduction for Inter and Split Syntax Elements", Joint Video Experts Team (JVET) of ITU-T SG16 WP3 and ISO/IEC JTC 1/SC29/WG11, Document: JVET-N0600, 14th Meeting: Geneva, Switzerland, Mar. 19, 2019, 8 pages.

Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, Document JVET-G1001-v1, 7th Meeting: Torino, Italy, Jul. 13, 2017, 48 pages.

Galpin et al., "Non-CE4: Affine and sub-block modes coding clean-up", Joint Video Experts Team (JVET) of ITU-T SG16 WP3 and ISO/IEC JTC 1/SC29/WG11, Document: JVET-O0500, 15th Meeting: Gothenburg, Sweden, Jul. 3, 2019, 4 pages.

Anonymous, "Series H: Audiovisual and Multimedia Systems, Infrastructure of audiovisual services—Coding of moving video—Reference software for ITU-T H.265 high efficiency video coding", International Telecommunication Union, ITU-T Telecommunication Standardization Sector of ITU, Recommendation ITU-T H.265.2, Oct. 2014, 12 pages.

Chen et al, "Algorithm description for Versatile Video Coding and Test Model 5 (VTM 5)", Joint Video Experts Team (JVET) of ITU-T SG 16 WP 3 and ISO/IECJTC 1/SC 29/WG 11, Document: JVET-N1002-v2, 14th Meeting, Geneva, Switzerland, Mar. 19, 2019, 76 pages.

Bross et al., "Versatile Video Coding (Draft 5) ", Joint Video Experts Team (JVET) of ISO/IEC JTC1/SC29/WG11 and ITU-T SG.16), Document: JVET-N1001-v8, 14th Meeting: Geneva, Switzerland, Mar. 19, 2019, 400 pages.

Bross, Benjamin et al., "Versatile Video Coding (Draft 3)", JVET-L1001-v9, Editors, JVET of ITU-T SG 16 WP 3 and ISO/IEC JTC 1/SC 29/WG 11, 12th Meeting: Macao, CN, Oct. 3-12, 2018, 233 pages.

Marpe, et al., "Context-Based Adaptive Binary Arithmetic Coding in the H.264/AVC Video Compression Standard", IEEE Transactions on Circuits and Systems for Video Technology, vol. X, No. Y, May 21, 2003, 18 pages.

Lai et al., "CE8-related: Clarification on Interaction Between CPR and Other Inter Coding Tools", JVET-M0175-v1, MediaTek Inc., Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-3.

Laroche et al., "CE4-related: On Merge Index Coding", JVET-L0194, Canon, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-3.

Li et al., "CE4-related: Affine Merge Mode with Prediction Offsets", JVET-L0320, Tencent America, Joint Video Experts Team (JVET) of ITU-T SG 16 WP 3 and ISO/IEC JTC 1/SC 29/WG 11, 12th Meeting: Macao, China, Oct. 3-12, 2018, pp. 1-6.

Yang et al., "CE4: Summary Report on Inter Prediction and Motion Vector Coding", JVET-L0024-v1, CE4 Coordinators, Joint Video Experts Team (JVET) of ITU-T SG 16 WP 3 and ISO/IEC JTC 1/SC 29/WG 11, 12th Meeting: Macao, China, Oct. 3-12, 2018, pp. 1-48.

Xiu, et al., "Draft text for advanced temporal motion vector prediction (ATMVP) and adaptive motion vector resolution (AMVR)", JVET-K0566_r3 Joint Video Experts Team (JVET) of ITU-T SG 16 WP 3 and ISO/IEC JTC 1/SC 29/WG 11th Meeting: Ljubljana, SI, Jul. 10-18, 2018, 68 pages.

* cited by examiner

MOTION VECTOR PREDICTION IN VIDEO ENCODING AND DECODING

CROSS-REFERENCE TO RELATED APPLICATIONS

This application is the National Stage Entry under 35 U.S.C. § 371 of Patent Cooperation Treaty Application No. PCT/EP2020/067497, filed Jun. 23, 2020, which claims priority from European Patent Application No. 19305833.6, filed Jun. 25, 2019, the disclosures of each of which are incorporated by reference herein in their entireties.

TECHNICAL FIELD

The present disclosure involves video encoding and decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original picture block and the predicted picture block, often denoted as prediction errors or prediction residuals, are transformed, quantized and entropy coded. To reconstruct the video, the compressed data is decoded by inverse processes corresponding to the prediction, transform, quantization and entropy coding. Various modifications and embodiments are envisioned as explained below that can provide improvements to a video encoding and/or decoding system including but not limited to one or both of increased compression or coding efficiency and decreased complexity.

SUMMARY

In general, an example of an embodiment can involve a method comprising decoding a first flag included in a coded bitstream, the first flag having been coded using Context-Based Arithmetic Coding (CABAC) based on a first probability model; decoding a second flag included in the coded bitstream, the second flag having been coded using CABAC based on a second probability model; and decoding picture information included in the coded bitstream based on a coding mode indicated by the first flag or the second flag; wherein the first flag indicates a subblock merge prediction mode, and the second flag indicates an inter affine prediction mode.

In general, another example of an embodiment can involve a method comprising determining a value of a first flag indicating a first prediction mode associated with encoding picture information; determining a value of a second flag indicating a second prediction mode associated with encoding picture information; and encoding at least a portion of the picture information and the first and second flags to form an encoded bitstream, wherein the first flag indicates a subblock merge prediction mode and is coded using CABAC coding based on a first probability model, and the second flag indicates an inter affine prediction mode and is coded using CABAC coding based on a second probability model.

In general, another example of an embodiment can involve apparatus comprising one or more processors configured to decode a first flag included in a coded bitstream, the first flag having been coded using CABAC coding based on a first probability model; decode a second flag included in the coded bitstream, the second flag having been coded using CABAC coding based on a second probability model; and decode encoded picture information included in the coded bitstream based on a coding mode indicated by the first flag or the second flag; wherein the first flag indicates a subblock merge prediction mode, and the second flag indicates an inter affine prediction mode.

In general, another example of an embodiment can involve apparatus comprising one or more processors configured to determine a value of a first flag indicating a first prediction mode associated with encoding picture information; determine a value of a second flag indicating a second prediction mode associated with encoding picture information; and encoding at least a portion of the picture information and the first and second flags to form an encoded bitstream, wherein the first flag indicates a subblock merge prediction mode and is coded using CABAC coding based on a first probability model, and the second flag indicates an inter affine prediction mode and is coded using CABAC coding based on a second probability model.

In general, another example of an embodiment can involve a bitstream formatted to include encoded picture information, wherein the encoded picture information is encoded by processing the picture information based on any one or more of the examples of embodiments of methods in accordance with the present disclosure.

In general, one or more other examples of embodiments can also provide a computer readable storage medium, e.g., a non-volatile computer readable storage medium, having stored thereon instructions for encoding or decoding picture information such as video data according to the methods or the apparatus described herein. One or more embodiments can also provide a computer readable storage medium having stored thereon a bitstream generated according to methods or apparatus described herein. One or more embodiments can also provide methods and apparatus for transmitting or receiving the bitstream generated according to methods or apparatus described herein.

Various modifications and embodiments are envisioned as explained below that can provide improvements to a video encoding and/or decoding system including but not limited to one or more of increased compression efficiency and/or coding efficiency and/or processing efficiency and/or decreased complexity.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below.

BRIEF DESCRIPTION OF THE DRAWINGS

The present disclosure may be better understood by consideration of the detailed description below in conjunction with the accompanying figures, in which.

It should be understood that the drawings are for purposes of illustrating examples of various aspects and embodiments and are not necessarily the only possible configurations. Throughout the various figures, like reference designators refer to the same or similar features.

DETAILED DESCRIPTION

Figure 1:
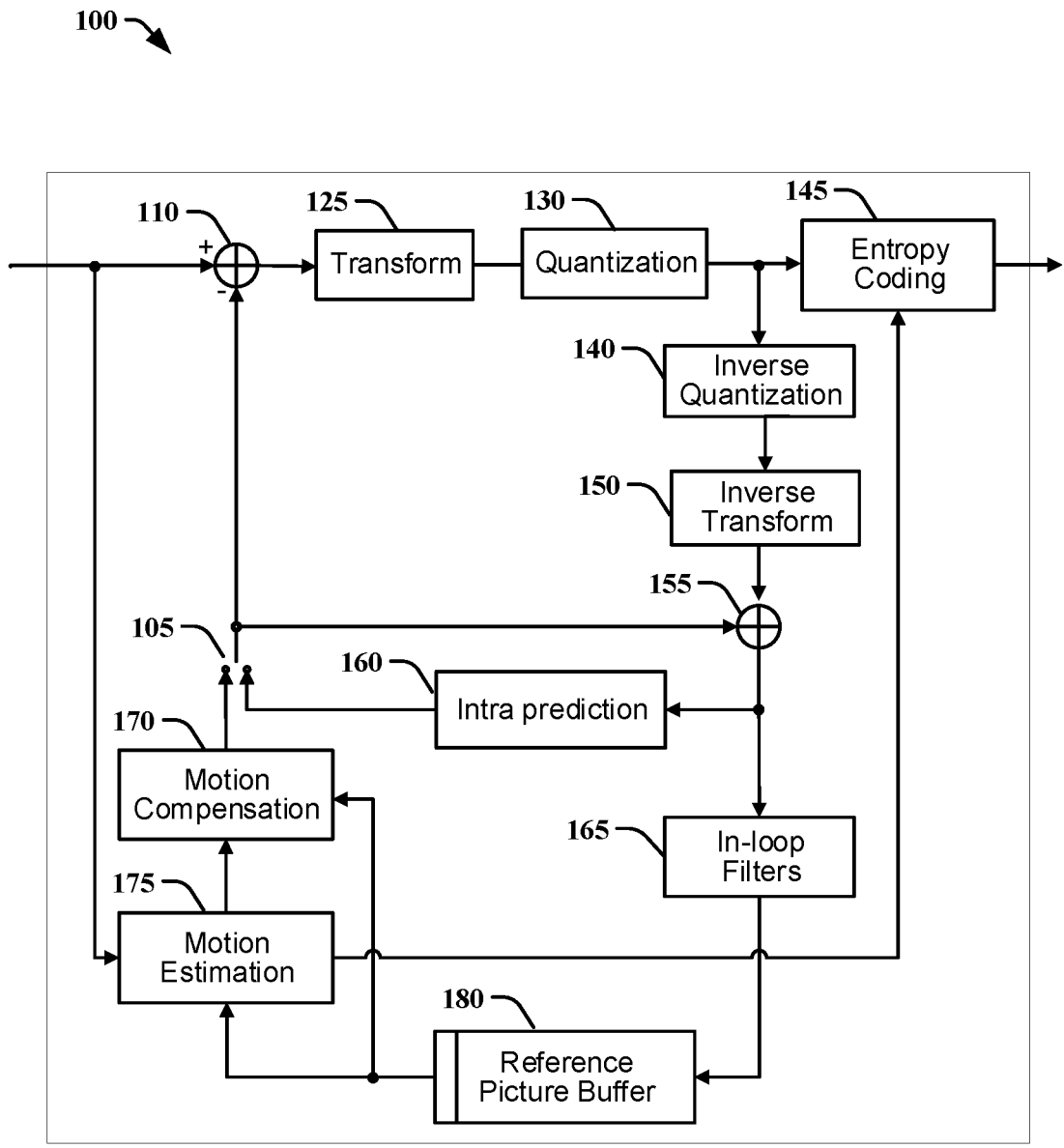
FIG. 1 provides a block diagram depicting an example of an embodiment of a video encoder.

Turning now to the figures, FIG. 1 illustrates an example of a video encoder 100, such as an HEVC encoder. HEVC is a compression standard developed by *Joint Collaborative Team on Video Coding (JCT-VC)* (see, e.g., "ITU-T H.265 TELECOMMUNICATION STANDARDIZATION SECTOR OF ITU (October 2014), SERIES H: AUDIOVISUAL AND MULTIMEDIA SYSTEMS, Infrastructure of audiovisual services—Coding of moving video, High efficiency video coding, Recommendation ITU-T H.265"). FIG. 1 may also illustrate an encoder in which improvements are made to the HEVC standard or an encoder employing technologies similar to HEVC, such as an encoder based on or improved upon JEM (Joint Exploration Model) under development by JVET.

In the present application, the terms "reconstructed" and "decoded" may be used interchangeably, the terms "pixel" and "sample" may be used interchangeably, and the terms "picture" and "frame" may be used interchangeably.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock and a partition as specified in H.264/AVC or other video coding standards, and more generally to refer to an array of data of various sizes.

In encoder 100 in FIG. 1, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
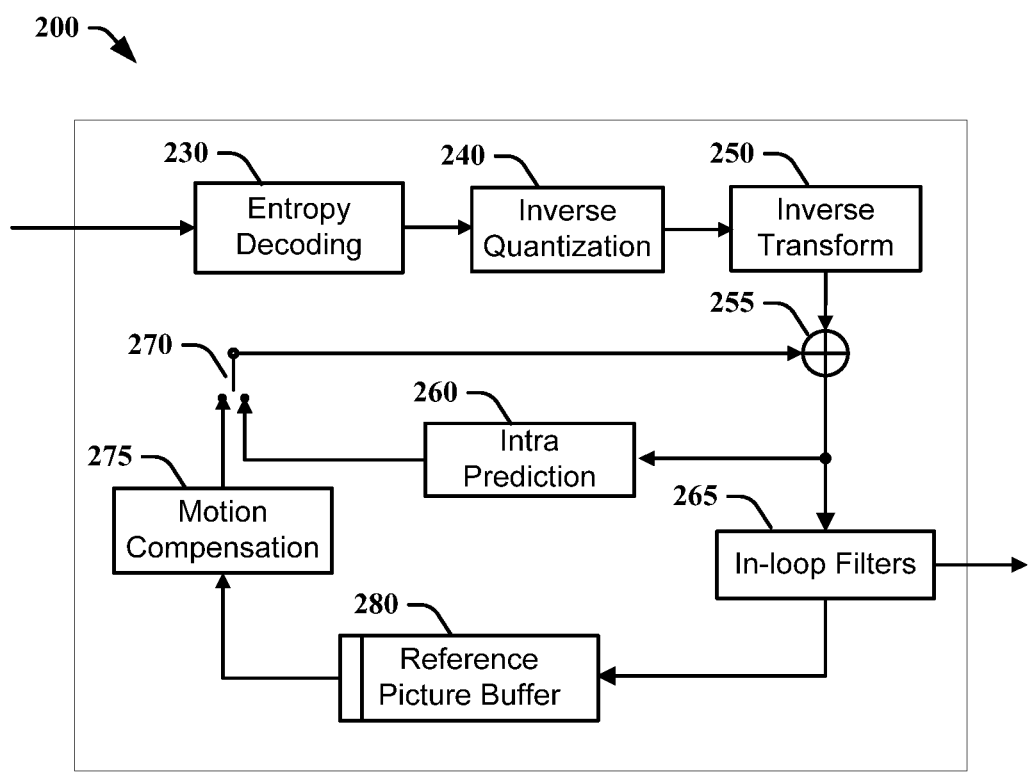
FIG. 2 provides a block diagram depicting an example of an embodiment of a video decoder.

FIG. 2 illustrates a block diagram of an example of a video decoder 200, such as an HEVC decoder. In the example decoder 200, a signal or bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a decoder based on or improved upon JEM.

In particular, the input of the decoder includes a video signal or bitstream, which can be generated by a video encoder such as video encoder 100 of FIG. 1. The signal or bitstream is first entropy decoded (230) to obtain transform coefficients, motion vectors, and other coded information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). Advanced Motion Vector Prediction (AMVP) and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

Figure 3:
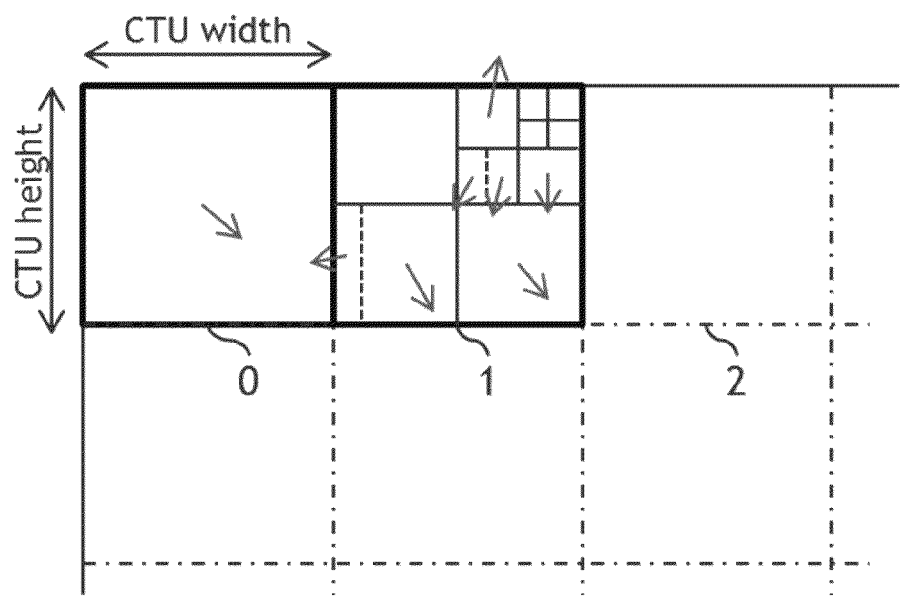
FIG. 3 illustrates aspects of the present disclosure involving a Coding Tree Unit (CTU)

In the HEVC video compression standard, motion compensated temporal prediction is employed to exploit the redundancy that exists between successive pictures of a video. To do so, a motion vector is associated to each prediction unit (PU). Each Coding Tree Unit (CTU) is represented by a Coding Tree (CT) in the compressed domain. This is a quad-tree division of the CTU, where each leaf is called a Coding Unit (CU) as illustrated in FIG. 3.

Figure 4:
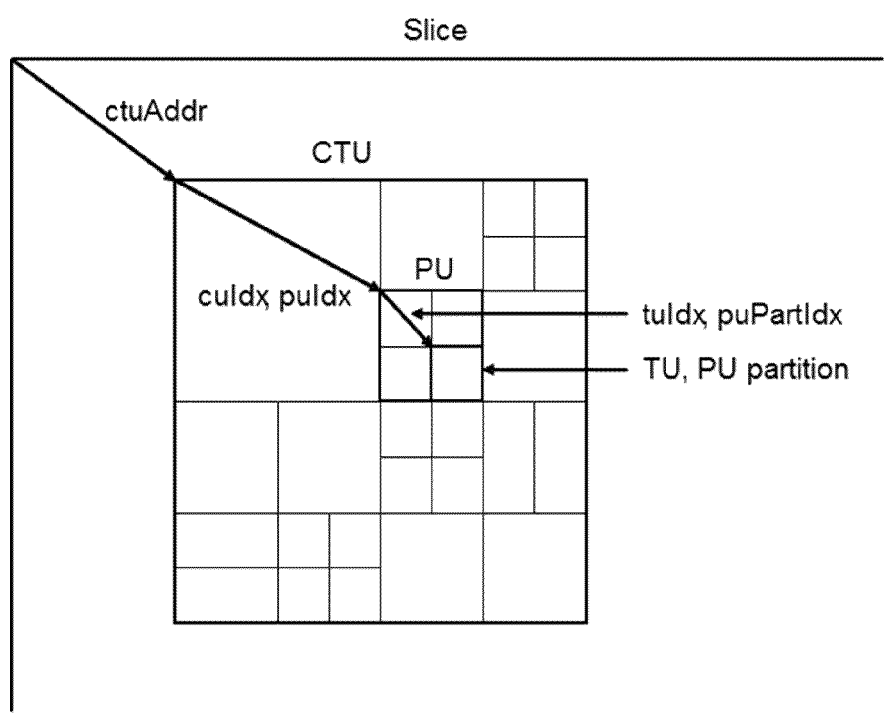
FIG. 4 illustrates aspects of the present disclosure involving a CTU and Coding Unit CU)

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level as illustrated in FIG. 4 which shows an example of division of a Coding Tree Unit into Coding Units, Prediction Units and Transform Units.

Exactly one Motion Vector is assigned to each PU in HEVC. This motion vector is used for motion compensated temporal prediction of the considered PU. Therefore, in HEVC, the motion model that links a predicted block and its reference block involves a translation.

Two modes are employed in HEVC to encode the motion data. They are respectively called AMVP (Adaptive Motion Vector Prediction) and Merge. AMVP involves signaling the reference picture(s) used to predict current PU, the Motion Vector Predictor index (taken among a list of two predictors) and a motion vector difference. In general, at least one embodiment as described herein involves the merge mode.

The merge mode comprises signaling and decoding the index of some motion data collected in a list of motion data predictors. The list is made of five candidates and is constructed the same way on the decoder and on the encoder sides. Therefore, the merge mode aims at deriving some motion information taken from the merge list. The merge list typically contains the motion information associated to some spatial and temporal surrounding blocks, available in their decoded state when the current PU is being processed.

In the Joint Exploration Model (JEM) developed by the JVET (Joint Video Exploration Team) group, some additional temporal prediction tools with associated parameters determined at the decoder side include the Sub-block Temporal Motion Vector Prediction (SbTMVP), also sometimes referred to as ATMVP (Alternative Temporal Motion Vector Prediction). The basic principle of SbTMVP is to derive some motion information for a current CU from some motion information contained in a reference picture of a current picture. To do so, a so-called temporal vector is first obtained, as the motion vector of the first merge candidate of the current CU. This temporal vector with its associated reference picture index can be used to retrieve motion vectors from the considered reference picture. To do so, the current CU is divided into N×N sub-CU, and the motion data pointed to by the temporal from the considered sub-CU center position is taken as the sub-CU MV SbTMVP predictor.

The SbTMVP motion prediction mode can be included as an additional candidate in the classical merge list. Another approach can be to insert the SbTMVP motion prediction mode in the Affine Merge list, which initially is dedicated to the construction of a set of Merge Candidates to predict the affine motion model of a current CU in case affine motion compensation is used for the current CU. The use of affine motion compensation for a current CU is signaled through a CU-level so-called affine flag. It appears that moving the SbTMVP motion predictor into the Affine merge list can lead to increased compression efficiency compared to other approaches, e.g., where the SbTMVP candidate is part of the classical merge candidate list.

Figure 5:
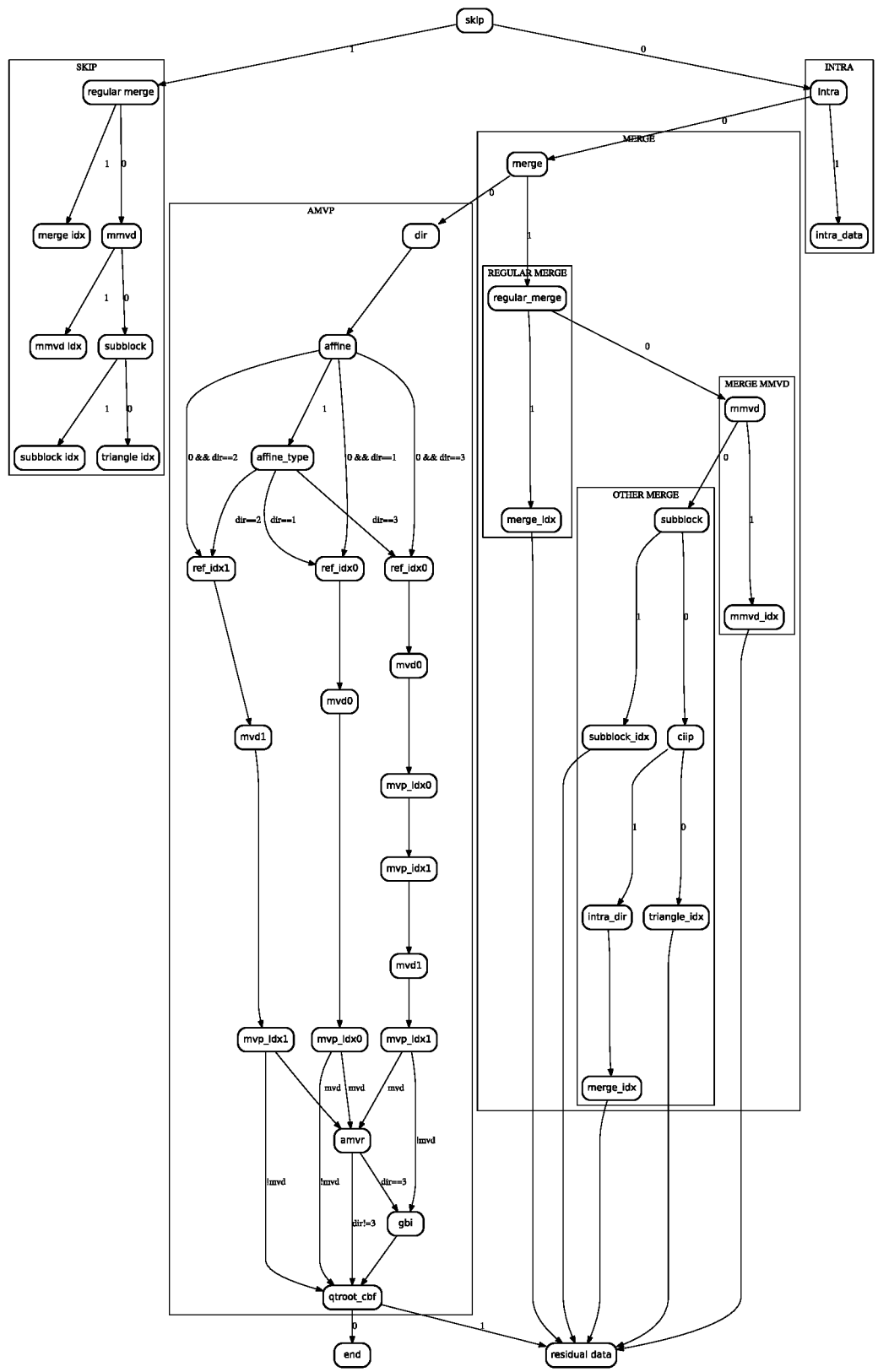
FIG. 5 provides a flow diagram illustrating an example of inter mode, e.g., in VTM-5.

FIG. 5 shows an example of the inter mode coding, e.g., in VTM-5:

First a skip flag is decoded, indicating if the CU contains any residual

A regular_merge flag is then decoded, indicating the use of the regular merge, containing the TMVP (temporal Motion Vector Predictor) candidate If not, the mmvd flag is decoded, indicating the use of the Merge Motion Vector Difference mode. This mode can also contain a candidate constructed from the TMVP candidate If not MMDV, the subblock flag is decoded. A sub-block candidate can be either an SbTMVP of affine candidate.

If not subblock, in the case of merge (not skip), a CIIP flag (Combined Intra-Inter Prediction) is decoded. This mode can also contain a candidate constructed from the TMVP candidate.

Finally, the triangle mode is inferred if none of the above modes are selected. This mode can also contain a candidate constructed from the TMVP candidate.

In AMVP mode (Advanced Motion Vector Prediction), the block can be either translational or affine. Note that the affine flag in AMVP is coded using the same CABAC context as the sub-block flag in skip or merge mode.

Merge mode in the HEVC standard involves deriving the inter prediction information (also called motion information in the following) of a given prediction unit from a selected motion information predictor candidate. The motion information includes all the inter prediction parameters of a PU, that is to say:

The uni-directional or bi-directional temporal prediction type

The reference picture index within each reference picture list

The motion vector(s)

Figure 6:
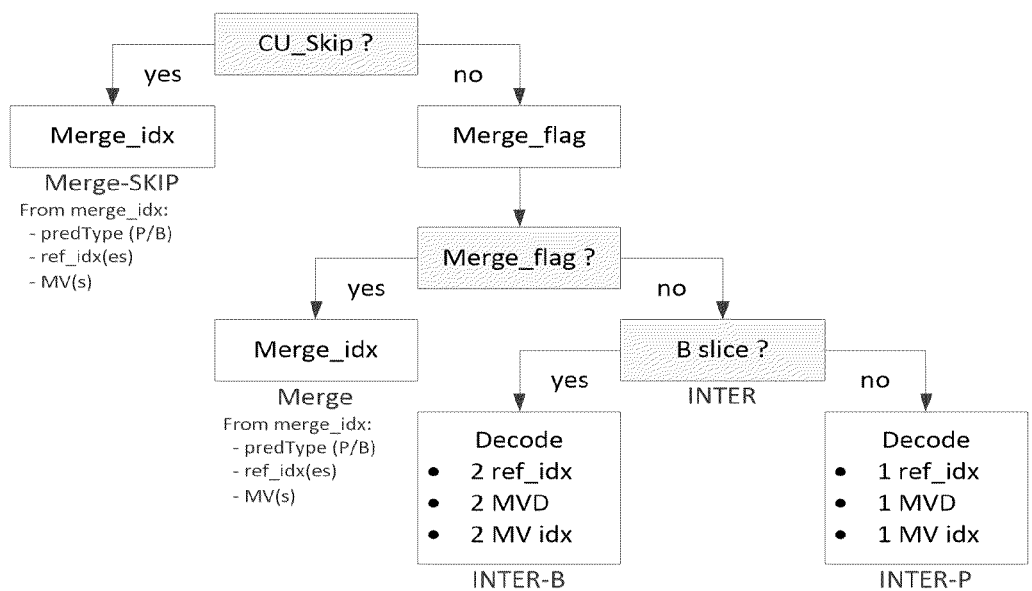
FIG. 6 provides a flow diagram illustrating an example of signaling inter prediction information, e.g., according to HEVC.

The coding and decoding of inter prediction information in HEVC is summarized in FIG. 6 which illustrates signaling of the inter prediction information. As can be seen, the motion information coding/decoding according to the merge mode takes place in two modes: the skip mode and the merge mode. In these two modes, one single field is being signaled to make the decoder able to retrieve the motion information of a PU: the so-called merge index. The merge index indicates which Motion Vector predictor in the list of merge motion information predictor is used to derive the motion information of current PU. In the following, the list of motion information predictors is called the merge list, or merge candidate list. Moreover, a candidate motion information predictor is called a merge candidate.

Figure 7:
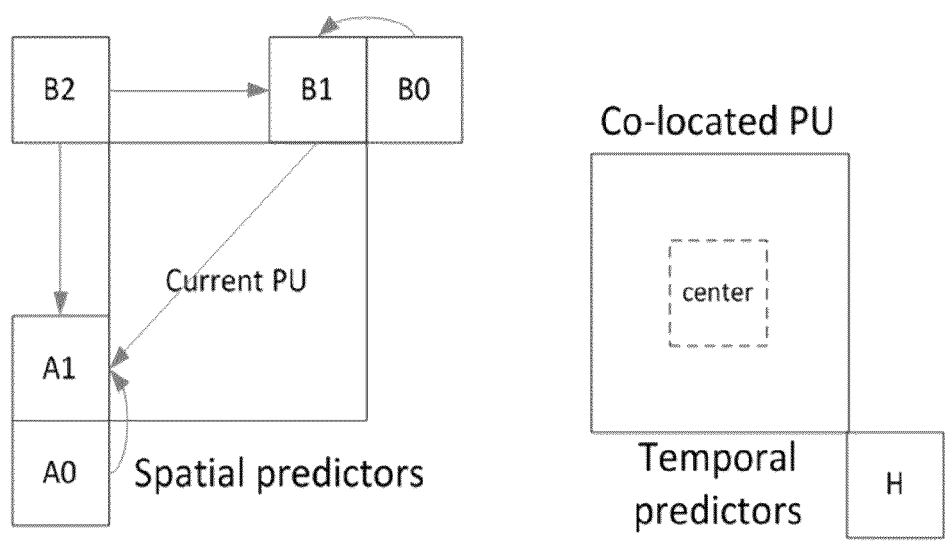
FIG. 7 provides a block diagram illustrating an example of positions of spatial and temporal motion vector predictors used in merge mode, e.g., in HEVC (Left: spatial merge candidates; Right: temporal merge candidates)
Figure 8:
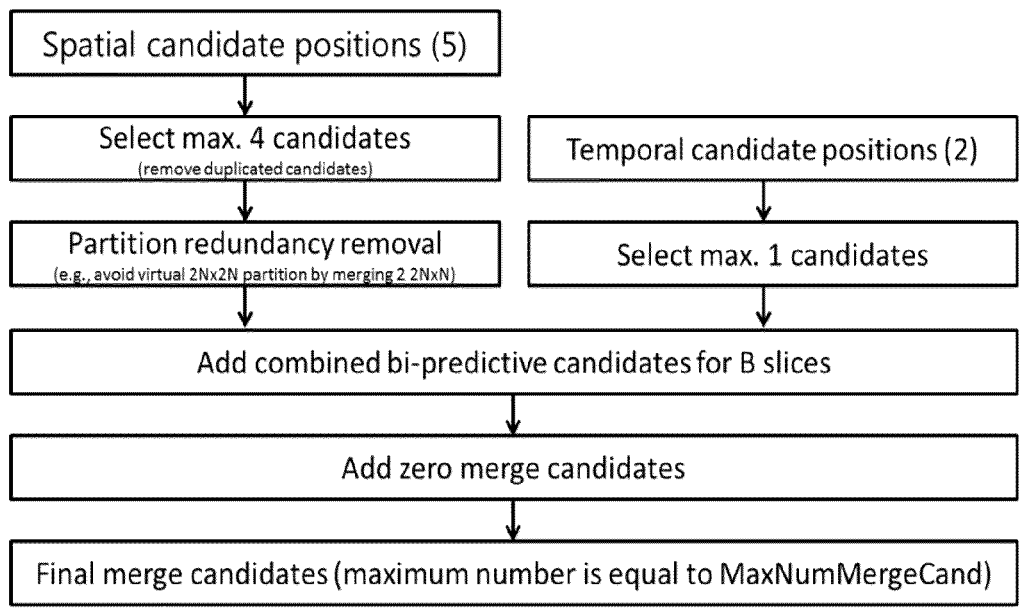
FIG. 8 provides a flow diagram illustrating an example of construction of a list of merge motion vector predictor candidates, e.g., in HEVC.

In HEVC, the merge candidate list is systematically made of five merge candidates. The merge list is constructed, both on the encoder and on the decoder sides, as follows. FIG. 7 illustrates positions of spatial and temporal motion vector predictors used in the merge mode. Spatial merge candidates are illustrated on the left side of FIG. 7. Temporal merge candidates are illustrated on the right side of FIG. 7. As can be seen in FIG. 7, up to five spatial positions can be considered to retrieve some potential candidates. They are visited according to the following order:

1—Left (A1)
2—Above (B1)
3—Above right (B0)
4—Left bottom (A0)
5—Above left (B2)

where the symbols A0, A1, B0, B1, B2 denote the spatial position shown on the left side of FIG. 7. Four spatial candidates which are different from each other are selected. Then a temporal predictor denoted TMVP is selected, by considering the temporal motion information located at position H, and then "center" is a candidate at position H in the considered reference picture that is not available. Then, the list of merge motion vector predictor candidates is constructed as illustrated in FIG. 8 which shows a last pruning process that takes place to ensure the selected set of spatial and temporal candidates does not contain redundant candidates.

Figure 9:
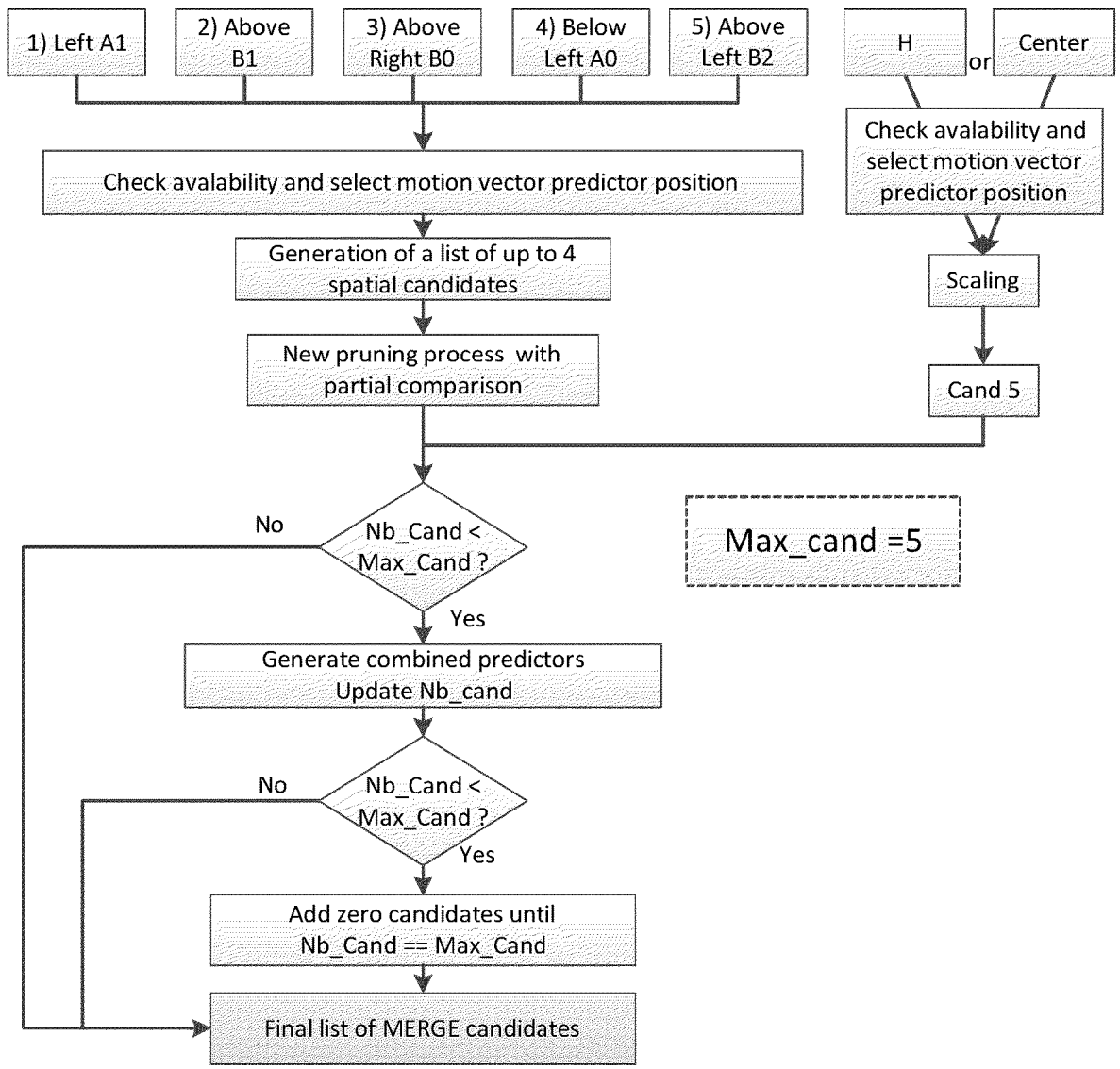
FIG. 9 provides another flow diagram illustrating another example of construction of a list of merge motion vector predictor candidates, e.g., in HEVC.

Next, in the case of a B slice, candidates of another type are pushed to the merge list if it is not full: the so-called combined candidates. This can involve forming a candidate made of the motion information associated with one reference picture list (L0) from one candidate already present in the list, with the motion associated to the other reference picture list (L1) from another candidate already present in the merge list. If the merge list is still not full (five elements) then zero motion vectors are pushed to the back of the merge list until it is full. The overall process of merge list construction in HEVC is detailed in the diagram of FIG. 9.

Figure 10:
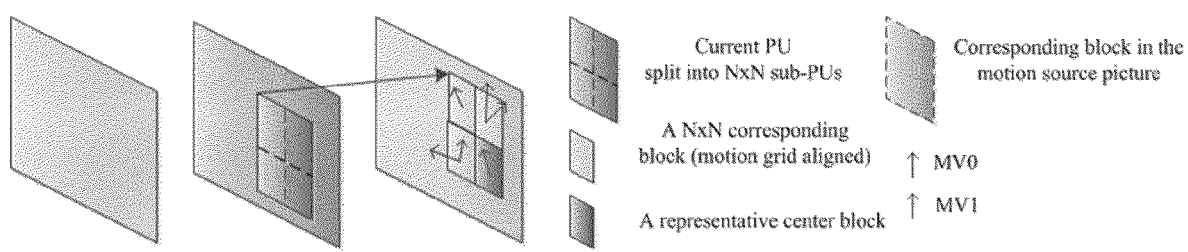
FIG. 10 illustrates an example of SbTMVP motion prediction for a CU, e.g., in JEM.

In the sub-block temporal motion vector prediction method (SbTMVP; also referred to as ATMVP), one or several temporal motion vector predictors for a current CU are retrieved from the reference picture(s) for the current CU. First, a so-called temporal motion vector and associated reference picture index are obtained as the motion data associated to the first candidate in the usual merge list candidate of current CU. Next, the current CU is divided into N×N sub-CU, N being typically equal to 4. This is shown in FIG. 10. For each N×N sub-block, the motion vector(s) and reference picture indice(s) are identified with the help of the temporal motion vector, in the reference picture associated to the temporal MV. The N×N sub-block in the reference pictures that is pointed to by the temporal MV from the current sub-CU position is considered. Its motion data is taken as the SbTMVP motion data prediction for current sub-CU. It is then converted to the motion vectors and reference picture indices of the current sub-CU, through appropriate motion vector scaling.

In general, an aspect of at least one example of an embodiment involves organizing the number and content of various lists of motion data predictors, in a way that improves the coding efficiency. In general, another aspect of at least one embodiment involves decreasing complexity to improve the worst case at the decoder side, e.g., by reducing the number of merge candidates to construct for a given mode. In general, another aspect of at least one embodiment involves making the affine mode coding more consistent by not mixing sub-block flag coding and affine flag coding.

At least one example of an embodiment provides for a temporal merge list containing one or more temporal predictors, for example, SbTMVP, TMVP, MMVD based on TMVP, CIIP based on TMVP, triangle based on TMVP, wherein these candidates are removed from the traditional merge list, thereby reducing complexity of the worst case at the decoder.

At least one example of an embodiment involves the temporal modes not contained in temporal merge list being kept in their respective list (e.g., MMVD, CIIP, triangle).

At least one example of an embodiment involves the temporal modes not contained in temporal merge list being completely removed in order to keep each list free from temporal predictor.

At least one example of an embodiment involves extracting the SbTMVP from sub-block and providing for making the coding of the affine flag consistent between merge/skip and AMVP modes.

At least one example of an embodiment involves separating the sub-block and affine flag coding.

Figure 11:
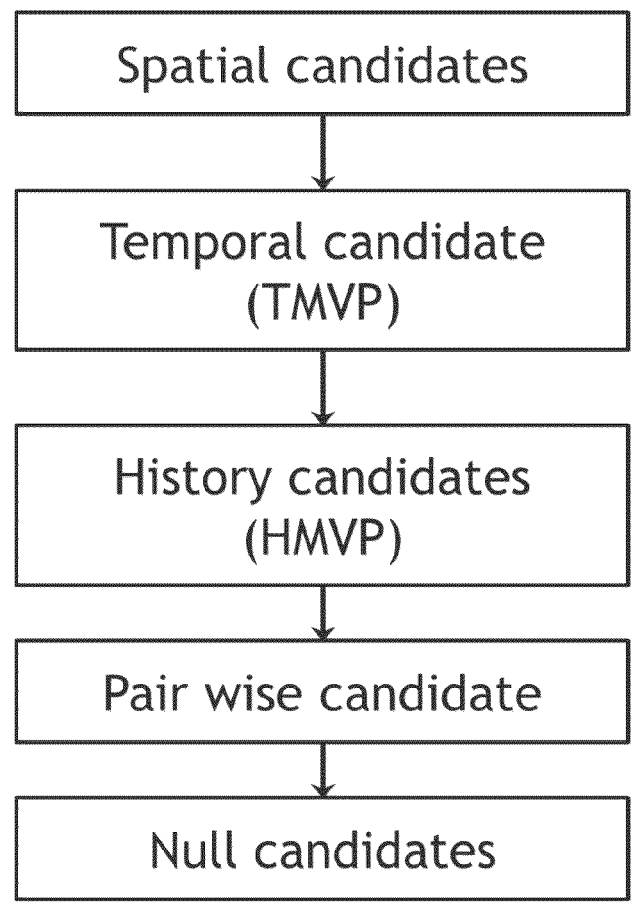
FIG. 11 illustrates an example of inter mode signaling using a temporal merge list.
Figure 12:
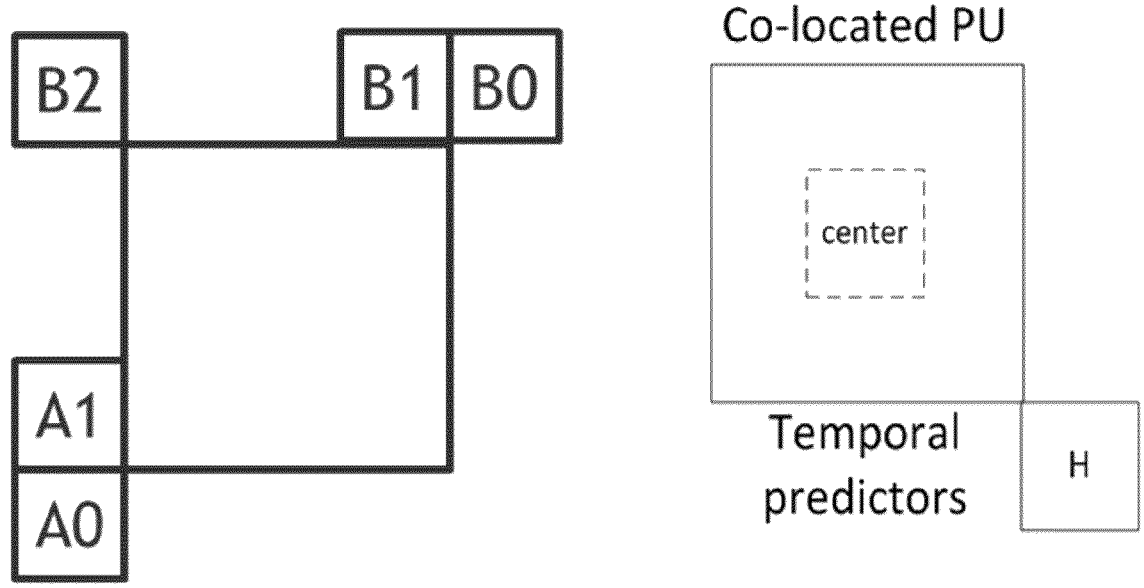
FIG. 12 illustrates an example of location of the motion vector predictor (Left: spatial predictors; Right: temporal predictors)
Figure 13:
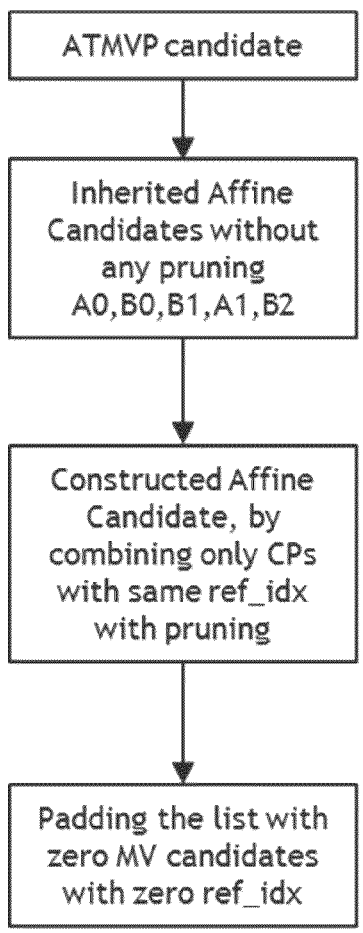
FIG. 13 illustrates an example of an embodiment of construction of a list of sub-block-based motion vector predictor candidates.
Figure 13:
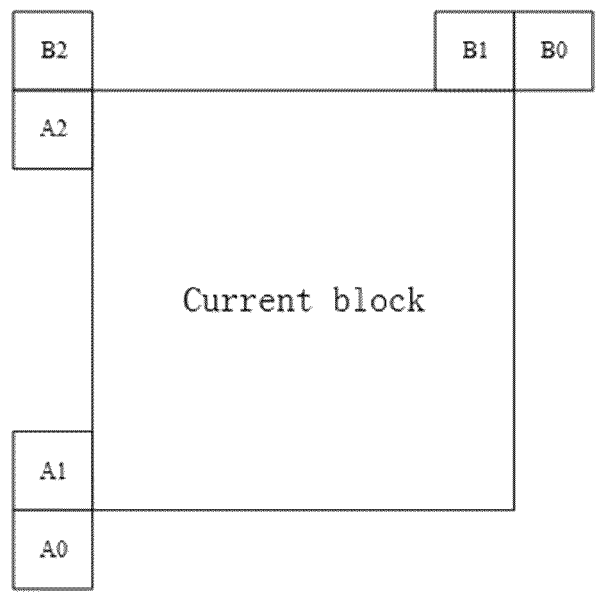

FIG. 11 illustrates an example of the construction of classical (as opposed to sub-block) merge list construction. By classical here one means the merge list used for translational motion compensated temporal prediction, where one motion vector is associated to a CU for each reference picture list. The process includes:
  adding of spatial candidates A1, B1, B0 A0 B2 with some pruning between them (see FIG. 13 for predictor locations).
  adding of the temporal candidate (TMVP) (either H or center)
  adding of the HMVP (History based Motion Vector Predictor) candidates with some pruning on at most A1 and B1 for the first added candidate
  if at least 2 candidates are in the list, create a pairwise (averaging) candidate
  stuff the list with null motion vector if needed An example of construction of the list of sub-block-based motion predictor candidates is now provided. The affine merge list gathers all merge MV predictors which involve a sub-block-based motion compensated temporal prediction. Thus, this includes the SbTMVP merge mode described above and affine merge modes. Affine merge candidates stand for merge candidates from which an 4×4 block based affine motion field is derived for current CU and used in the temporal prediction of current CU. Affine motion compensation is not described in detail here. One aspect to note here is that in at least one example the SbTMVP candidate is placed at the front of the affine merge list.

Other examples of merge lists can include the following:
  The MMVD merge list is composed of the first two classical merge candidates, displaced by some given motion vector difference signaled in the bitstream. This list may thus contain candidates based on the temporal candidate (TMVP candidate displaced).
  The CIIP merge list is the same as the classical merge list. This list may thus contain a candidate based on the temporal candidate. The final predictor is a mix between the motion-based predictor and an intra prediction.
  The triangle merge list is composed of candidates created from the candidates of the classical merge list. This list may thus contain candidates based on the temporal candidate.

In general, at least one aspect of at least one example of an embodiment described herein involves creating a merge list containing the temporal candidates.

Figure 14:
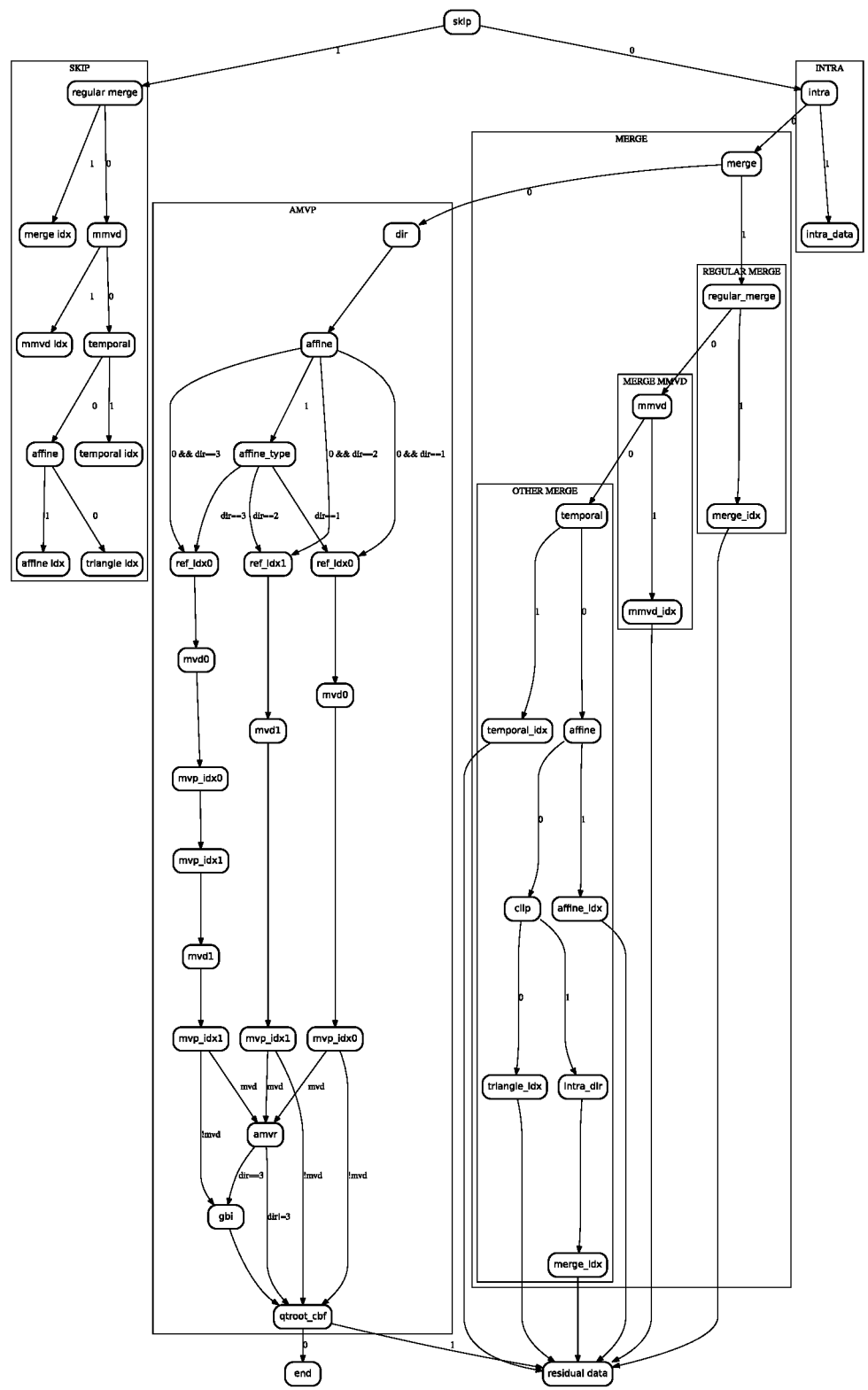
FIG. 14 provides a flow diagram illustrating an example of an embodiment of an inter decoding process with temporal merge list.

FIG. 14 shows an example of an embodiment of a modified process for decoding the temporal merge list including at least the following:

After the mmvd mode flag decoding, if mmvd flag is false a temporal mode flag is decoded.

If the temporal mode is true, the temporal candidate index is decoded, similarly to the classical merge candidate index.

If not, the affine mode flag is decoded. Note that the affine flag replaces the sub-block mode flag, as the SbTMVP candidate has been removed from the list. Thanks to this splitting, the affine flag coding in merge mode and in AMVP mode uses the same CABAC bins in a consistent way (in contrast to an approach where the subblock flag meant both SbTMVP or affine mode).

In general, at least one aspect of at least one example of an embodiment can involve providing for various placements of a temporal merge list. For example, the temporal merge list can also be inserted:

As the first merge list
After the regular merge list
After the affine merge list
After the ciip merge list
After the triangle merge list. In this case, the temporal mode is deduced to be true if the triangle mode is false.

In general, a list of temporal candidates can be created the same way the merge list is created by adding potential candidates (when they exist) in a fixed order, up to a maximum of merge candidates (typically 2 or 3). An index indicating the position in the list of the temporal candidates to use is then transmitted to the decoder. An example of a list of temporal candidates is:

The SbTMVP candidate
The TMVP candidate
The temporal CIIP candidate
Variants can include one or more of the following:
With additional signaling the TMVP candidates for MMVD and triangle mode can also be added to the list. To do so, additional information (typically a mmvd flag and the mmvd displacement).
The TMVP candidates for MMVD, and/or triangle, and/or CIIP are kept in their original lists.
The TMVP candidates for MMVD, and/or triangle, and/or CIIP are completely removed, keeping all other lists from having temporal candidates. Optionally, in this variant, the reconstructed affine candidates do not use temporal motion vector in order to keep the affine merge list clear from temporal motion vectors.
Purely temporal reconstructed affine candidate are also added to the temporal list.

In general, one or more of the described embodiments can provide for:

Reduced complexity of the decoder process where a given merge list (regular, mmvd, temporal, affine, ciip, or triangle) has a reduced worst case complexity (e.g., the length(s) of the list(s) are decreased).
The bandwidth required to construct each candidates of the list is reduced since all spatial candidates are in a separate list, without the need to access the temporal memory buffer. Typically, in all lists except the temporal one, only spatial information surrounding the current block needs to be put in cache.

Table 1 appended to the present disclosure provides an example of an embodiment of syntax for a coding of the temporal merge list flag. The example shown in Table 1 involves providing syntax for a coding of the temporal merge list flag after the MMVD flag. Note that the subblock syntax is replaced by the affine syntax as in the AMVP derivation (underlined).

In case of SbTMVP and TMVP only temporal merge list, a variable MaxNumTemporalMergeCand is equal to at most two when both candidates are available. Candidates availability is derived as before, wherein SbTMVP is available if the SbTMVP SPS level flag is true and the current block size is greater or equal to 8 for both width and height
TMVP is available if temporal flag at SPS level is true and width+height is greater than 12.

Another aspect of at least one example of an embodiment can involve affine and sub-block flag coding. In certain systems, the coding of the merge_subblock_flag (in merge/skip modes) and inter_affine_flag (in AMVP) can involve sharing the same CABAC coding. In case of a separate temporal list such as in at least one embodiment described herein, (i.e., SbTMVP is not in the sub-block list anymore), the merge_subblock_flag actually becomes a merge_affine_flag so that the CABAC coding becomes more consistent. Another variant without using a separate temporal merge list is to use two separate CABAC coding: one for the merge_subblock_flag and one for the inter_affine_flag.

Figure 16:
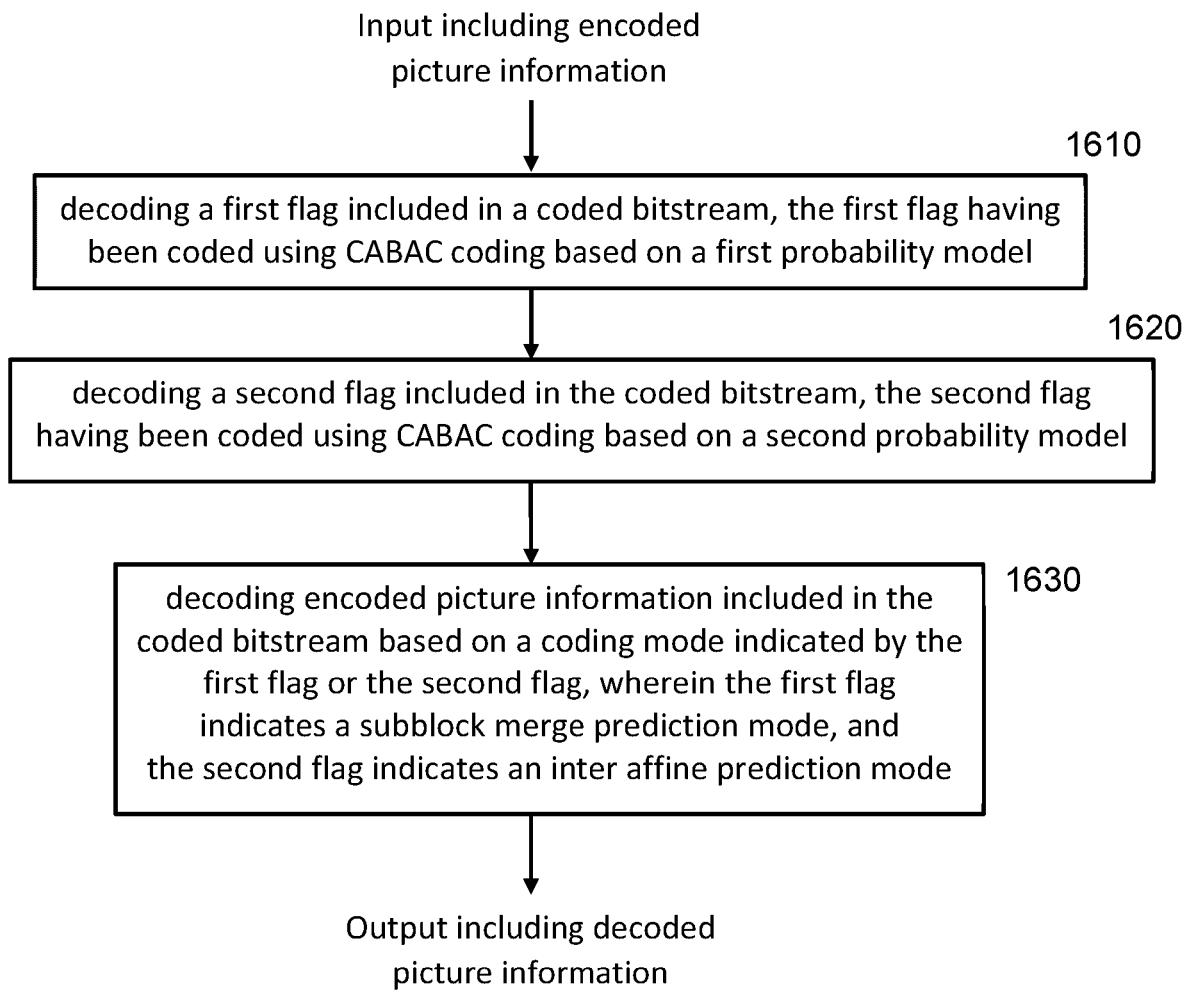
FIG. 16 and FIG. 17 illustrate examples of embodiments as described herein.

In general, another example of an embodiment is illustrated in FIG. 16. In FIG. 16, a bitstream including encoded picture information also includes encoded control information such as flags. At 1610, a first flag included in the coded bitstream is decoded using CABAC coding based on a first probability model. At 1620, a second flag included in the coded bitstream is decoded using CABAC coding based on a second probability model. That is, two separate CABAC codings are used for decoding the first and second flags. Then, at 1630, encoded picture information included in the bitstream is decoded based on a coding mode indicated by the first flag or second flag to produce decoded picture information. For example, the first flag can indicate, correspond to, or be associated with a coding mode such as a subblock merge prediction mode, and the second flag can indicate, correspond to, or be associated with a coding mode such as an inter affine prediction mode.

Figure 17:
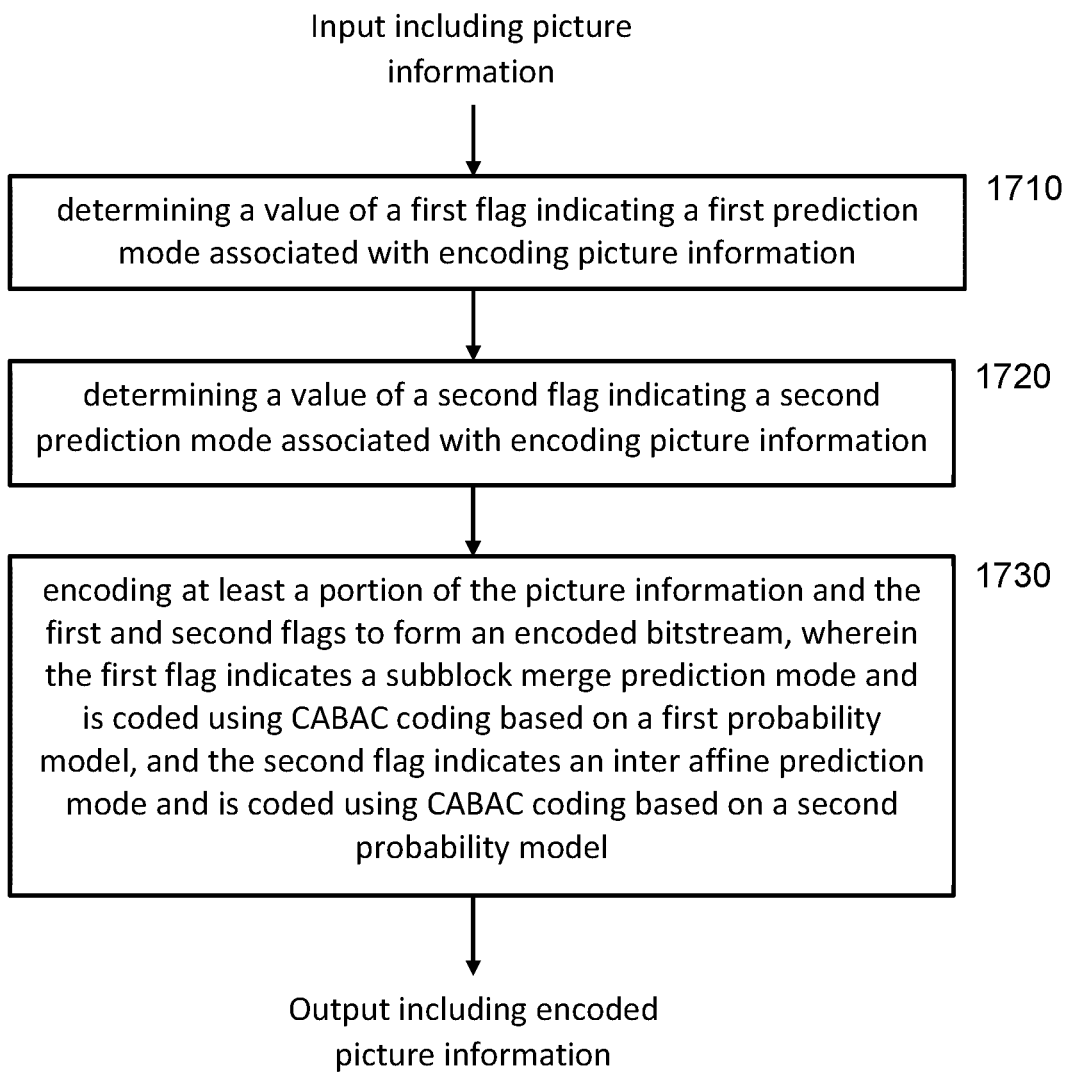

In general, another example of an embodiment is illustrated in FIG. 17. In FIG. 17, at 1710, a value of a first flag is determined where the first flag indicates a first prediction mode associated with encoding picture information included in an input. At 1720, a value of a second flag is determined where the second flag indicates a second prediction mode associated with encoding picture information. At 1730, at least a portion of the picture information and the first and second flags are encoded to form an encoded bitstream, wherein the first flag indicates, for example, a subblock merge prediction mode and is coded using CABAC coding based on a first probability model, and the second flag indicates, for example, an inter affine prediction mode and is coded using CABAC coding based on a second probability model. That is, two separate CABAC codings are used for encoding the first and second flags.

This document describes various examples of embodiments, features, models, approaches, etc. Many such examples are described with specificity and, at least to show the individual characteristics, are often described in a manner that may appear limiting. However, this is for purposes of clarity in description, and does not limit the application or scope. Indeed, the various examples of embodiments, features, etc., described herein can be combined and interchanged in various ways to provide further examples of embodiments. Examples of embodiments in accordance with the present disclosure include but are not limited to the following.

In general, an example of an embodiment can involve a method comprising decoding a first flag included in a coded bitstream, the first flag having been coded using CABAC coding based on a first probability model; decoding a second flag included in the coded bitstream, the second flag having been coded using CABAC coding based on a second probability model; and decoding picture information included in the coded bitstream based on a coding mode indicated by the first flag or the second flag; wherein the first flag indicates a subblock merge prediction mode, and the second flag indicates an inter affine prediction mode.

In general, another example of an embodiment can involve a method comprising determining a value of a first flag indicating a first prediction mode associated with encoding picture information; determining a value of a second flag indicating a second prediction mode associated with encoding picture information; and encoding at least a portion of the picture information and the first and second flags to form an encoded bitstream, wherein the first flag indicates a subblock merge prediction mode and is coded using CABAC coding based on a first probability model, and the second flag indicates an inter affine prediction mode and is coded using CABAC coding based on a second probability model.

In general, another example of an embodiment can involve apparatus comprising one or more processors configured to decode a first flag included in a coded bitstream, the first flag having been coded using CABAC coding based on a first probability model; decode a second flag included in the coded bitstream, the second flag having been coded using CABAC coding based on a second probability model; and decode encoded picture information included in the coded bitstream based on a coding mode indicated by the first flag or the second flag; wherein the first flag indicates a subblock merge prediction mode, and the second flag indicates an inter affine prediction mode.

In general, another example of an embodiment can involve apparatus comprising one or more processors configured to determine a value of a first flag indicating a first prediction mode associated with encoding picture information; determine a value of a second flag indicating a second prediction mode associated with encoding picture information; and encoding at least a portion of the picture information and the first and second flags to form an encoded bitstream, wherein the first flag indicates a subblock merge prediction mode and is coded using CABAC coding based on a first probability model, and the second flag indicates an inter affine prediction mode and is coded using CABAC coding based on a second probability model.

In general, another example of an embodiment can involve a bitstream formatted to include encoded picture information, wherein the encoded picture information is encoded by processing the picture information based on any one or more of the examples of embodiments of methods in accordance with the present disclosure.

In general, one or more other examples of embodiments can also provide a computer readable storage medium, e.g., a non-volatile computer readable storage medium, having stored thereon instructions for encoding or decoding picture information such as video data according to the methods or the apparatus described herein.

In general, at least one example of an embodiment can involve a computer program product including instructions, which, when executed by a computer, cause the computer to carry out a method in accordance with one or more examples of embodiments described herein.

In general, at least one example of an embodiment can involve a non-transitory computer readable medium storing executable program instructions to cause a computer executing the instructions to perform a method in accordance with one or more examples of embodiments described herein.

In general, at least one example of an embodiment can involve a signal comprising data generated according to any one or more examples of embodiments described herein.

In general, at least one example of an embodiment can involve a bitstream, formatted to include syntax elements and encoded image information generated in accordance with any one or more of the examples of embodiments described herein.

In general, at least one example of an embodiment can involve a computer readable storage medium having stored thereon a bitstream generated according to methods or apparatus described herein.

In general, at least one example of an embodiment can involve transmitting or receiving a bitstream or signal generated according to methods or apparatus described herein.

In general, at least one example of an embodiment can involve a device comprising an apparatus in accordance with any one or more of the examples of embodiments described herein; and at least one of (i) an antenna configured to receive a signal, the signal including data representative of the image information, (ii) a band limiter configured to limit the received signal to a band of frequencies that includes the data representative of the image information, and (iii) a display configured to display an image from the image information.

In general, at least one example of an embodiment can involve a device as described herein, wherein the device comprises one of a television, a television signal receiver, a set-top box, a gateway device, a mobile device, a cell phone, a tablet, or other electronic device.

In general, another example of an embodiment can involve apparatus comprising one or more processors configured to determine a value of a first flag indicating a first prediction mode associated with encoding picture information; determine a value of a second flag indicating a second prediction mode associated with encoding picture information; and encode at least a portion of the picture information and the first and second flags to form an encoded bitstream, wherein the first flag indicates a subblock merge prediction mode and is coded using a CABAC coding based on a first probability model, and the second flag indicates an inter affine prediction mode and is coded using a CABAC coding based on a second probability model.

In general, the examples of embodiments described and contemplated in this document can be implemented in many different forms. FIGS. 1 and 2 described above and FIG. 15 described below provide some embodiments, but other embodiments are contemplated and the discussion of FIGS. 1, 2 and 15 does not limit the breadth of the implementations. At least one embodiment generally provides an example related to video encoding and/or decoding, and at least one other embodiment generally relates to transmitting a bitstream or signal generated or encoded. These and other embodiments can be implemented as a method, an apparatus, a computer readable storage medium having stored thereon instructions for encoding or decoding video data according to any of the methods described, and/or a computer readable storage medium having stored thereon a bitstream or signal generated according to any of the methods described.

The terms HDR (high dynamic range) and SDR (standard dynamic range) are used in this disclosure. Those terms often convey specific values of dynamic range to those of ordinary skill in the art. However, additional embodiments are also intended in which a reference to HDR is understood to mean "higher dynamic range" and a reference to SDR is understood to mean "lower dynamic range". Such additional embodiments are not constrained by any specific values of dynamic range that might often be associated with the terms "high dynamic range" and "standard dynamic range".

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, for example, motion estimation and/or compensation modules such as modules 170 and/or 175 of a video encoder such as encoder 100 shown in FIG. 1 and/or motion compensation module 275 of video decoder 200 shown in FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example. The specific values are for example purposes and the aspects described are not limited to these specific values.

Figure 15:
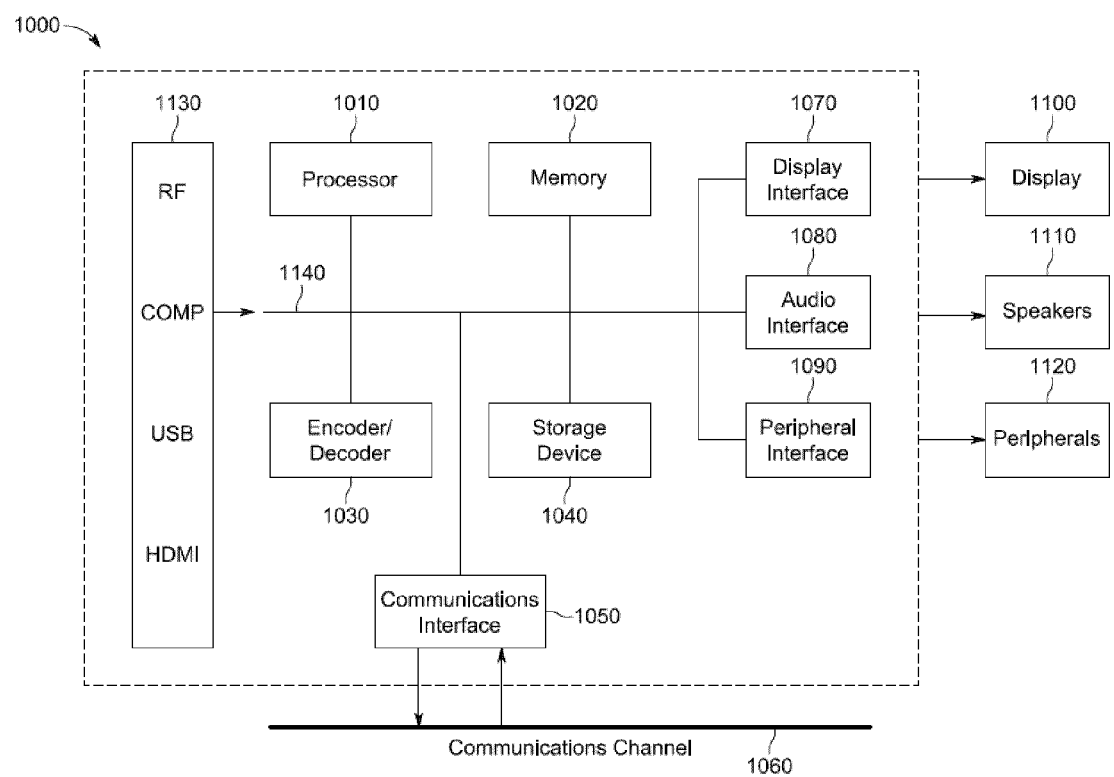
FIG. 15 provides a block diagram illustrating an example of an embodiment of an apparatus or system in accordance with various aspects described herein.

FIG. 15 illustrates a block diagram of an example of a system in which various aspects and embodiments can be implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream or signal, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of system 1000 can be provided within an integrated housing. Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Throughout this disclosure, various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting a picture from a tiled (packed) picture, determining an upsample filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Also, various implementations involve encoding. In an analogous way to the above discussion about "decoding", "encoding" as used in this application can encompass all or part of the processes performed, for example, on an input video sequence in order to produce an encoded bitstream or signal. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches can be based on an extensive testing of all encoding options, including all considered modes or coding parameters values, with a complete evaluation of their coding cost and related distortion of the reconstructed signal after coding and decoding. Faster approaches can also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "obtaining" various pieces of information. Obtaining the information can include one or more of, for example, determining the information, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for refinement. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream or signal of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various embodiments have been described. Embodiments may include any of the following features or entities, alone or in any combination, across various different claim categories and types:

Providing, in an encoder and/or decoder for processing video, at least one merge mode based on a merge list containing the temporal candidates.

Providing, in an encoder and/or decoder for processing video, at least one merge mode based on organizing the number and content of various lists of motion data predictors, in a way that improves the coding efficiency.

Providing, in an encoder and/or decoder for processing video, based on decreasing complexity to improve a worst case at the decoder side, e.g., by reducing the number of merge candidates to construct for a given mode.

Providing, in an encoder and/or decoder for processing video, having improved consistency of coding of an affine mode based on not mixing sub-block flag coding and affine flag coding.

Providing, in an encoder and/or decoder for processing video, based on a temporal merge list containing one or more temporal predictors, including one or more of SbTMVP, or TMVP, or MMVD based on TMVP, or CIIP based on TMVP, or triangle based on TMVP, wherein these candidates are removed from the traditional merge list, thereby reducing complexity of the worst case at the decoder.

Providing, in an encoder and/or decoder for processing video, based on at least one temporal mode not contained in a temporal merge list and being kept in a respective list (e.g., MMVD, CIIP, triangle).

Providing, in an encoder and/or decoder for processing video, based on at least one temporal mode not contained in a temporal merge list and being completely removed in order to keep each list free from temporal predictor.

Providing, in an encoder and/or decoder for processing video, based on extracting a SbTMVP from sub-block and providing for making the coding of an affine flag consistent between merge/skip and AMVP modes.

Providing, in an encoder and/or decoder for processing video, based on separating a sub-block coding and an affine flag coding.

Providing, in an encoder and/or decoder for processing video, based on a modified process for decoding a temporal merge list comprising:
After a mmvd mode flag decoding, if mmvd flag is false a temporal mode flag is decoded,
If a temporal mode is true, a temporal candidate index is decoded,
If a temporal mode is not true, an affine mode flag is decoded, wherein the affine flag replaces a sub-block mode flag based on a SbTMVP candidate having been removed from the merge list, and wherein the affine flag coding in merge mode and in AMVP mode uses the same CABAC bins in a consistent way.

Providing, in an encoder and/or decoder for processing video, based on providing for various placements of a temporal merge list, wherein the temporal merge list can also be inserted:
As the first merge list, or
After the regular merge list, or
After the affine merge list, or
After the CIIP merge list, or
After the triangle merge list, wherein the temporal mode is deduced to be true if the triangle mode is false.

Providing, in an encoder and/or decoder for processing video, based on a list of temporal candidates created by adding potential candidates in a fixed order, up to a maximum of merge candidates, wherein an index indicating the position in the list of the temporal candidates to use is then transmitted to the decoder, and where the potential candidates comprise one or more of
a SbTMVP candidate, or
a TMVP candidate, or
a temporal CIIP candidate.

Providing, in an encoder and/or decoder for processing video, based on a merge list created including at least one of:
signaling indicating that a TMVP candidate for MMVD or a triangle mode candidate can be added to a merge list, or
a TMVP candidate for MMVD, and/or triangle, and/or CIIP are kept in respective original lists, or
a TMVP candidate for MMVD, and/or triangle, and/or CIIP are completely removed, keeping all other lists from having temporal candidates, or
a TMVP candidate for MMVD, and/or triangle, and/or CIIP are completely removed, keeping all other lists from having temporal candidates, wherein the reconstructed affine candidates do not use temporal motion vector in order to keep the affine merge list clear from temporal motion vectors, or
a purely temporal reconstructed affine candidate is added to the temporal list Providing, in an encoder and/or decoder for processing video, based on reducing complexity of a decoder process, wherein a given merge list has a reduced worst case complexity.

Providing, in an encoder and/or decoder for processing video, based on reducing complexity of a decoder process, wherein a given merge list has a reduced worst case complexity comprising a length of one or more merge lists is reduced.

Providing, in an encoder and/or decoder for processing video, based on reducing complexity of a decoder process, wherein a given merge list has a reduced worst case complexity comprising a length of one or more merge lists is reduced, wherein the given merge list comprises at least one of a regular, mmvd, temporal, affine, ciip, or triangle.

Providing, in an encoder and/or decoder for processing video, based on a bandwidth associated with constructing each candidate of a merge list being reduced, wherein all spatial candidates are in a separate list and without the need to access a temporal memory buffer.

Inserting in the signaling syntax elements that enable an encoder to provide for at least one merge mode based on a merge candidate list as described herein.

Selecting, based on these syntax elements, a merge mode to apply at the decoder.

A bitstream or signal that includes one or more of the described syntax elements, or variations thereof.

Inserting in the signaling syntax elements that enable a decoder to provide a merge mode in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs video encoding and/or decoding according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs video encoding and/or decoding according to any of the embodiments described.

A TV, set-top box, cell phone, tablet, or other electronic device that receives (e.g. using an antenna) a signal over the air that includes an encoded image, and performs video encoding and/or decoding according to any of the embodiments described.

A computer program product storing program code that, when executed by a computer implements video encoding and/or decoding in accordance with any of the embodiments described.

A non-transitory computer readable medium including executable program instructions causing a computer executing the instructions to implement video encoding and/or decoding in accordance with any of the embodiments described.

Various other generalized, as well as particularized embodiments are also supported and contemplated throughout this disclosure.

TABLE 1

| An example of an embodiment of syntax in accordance with the present disclosure | |
|---|---|
| | Descriptor |
| merge_data( x0, y0, cbWidth, cbHeight ) { | |
|   if ( CuPredMode[ x0 ][ y0 ] = = MODE_IBC ) { | |
|     if( MaxNumMergeCand > 1 ) | |
|       merge_idx[ x0 ][ y0 ] | ae(v) |
|   } else { | |
|     if( sps_mmvd_enabled_flag  \|\|  cbWidth * cbHeight != 32 ) | |

TABLE 1-continued

| An example of an embodiment of syntax in accordance with the present disclosure | |
|---|---|
| | Descriptor |
|       regular_merge_flag[ x0 ][ y0 ] | ae(v) |
|     if ( regular_merge_flag[ x0 ][ y0 ] = = 1 ){ | |
|       if( MaxNumMergeCand > 1 ) | |
|         merge_idx[ x0 ][ y0 ] | ae(v) |
|     } else { | |
|       if( sps_mmvd_enabled_flag && cbWidth * cbHeight != 32 ) | |
|         mmvd_merge_flag[ x0 ][ y0 ] | ae(v) |
|       if( mmvd_merge_flag[ x0 ][ y0 ] = = 1 ) { | |
|         if( MaxNumMergeCand > 1 ) | |
|           mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         If (MaxNumTemporalMergeCand>0) | |
|           <u>merge_temporal_flag[x0][y0]</u> | ae(v) |
|         <u>if( merge_temporal_flag[ x0 ][ y0 ] = = 1 ) {</u> | |
|           <u>if(MaxNumTemporalMergeCand > 1 )</u> | |
|             <u>merge_temporal_idx[ x0 ][ y0 ]</u> | |
|         <u>} else {</u> | |
|           merge_affine_flag[ x0 ][ y0 ] | ae(v) |
|         if( merge_affine_flag[ x0 ][ y0 ] = = 1 ) { | |
|           if( MaxNumAffineMergeCand > 1 ) | |
|             merge_affine_idx[ x0 ][ y0 ] | ae(v) |
|         } else { | |
|           if( sps_ciip_enabled_flag && | |
|           cu_skip_flag[ x0 ][ y0 ] = = 0 && | |
|           ( cbWidth * cbHeight ) >= 64 && cbWidth < | |
|           128 && cbHeight < 128 ) { | |
|             ciip_flag[ x0 ][ y0 ] | ae(v) |
|           if( ciip_flag[ x0 ][ y0 ] && | |
|           MaxNumMergeCand > 1 ) | |
|             merge_idx[ x0 ][ y0 ] | ae(v) |
|         } | |
|         if( MergeTriangleFlag[ x0 ][ y0 ] ) { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } | |
|       } | |
|     } | |
|     <u>}</u> | |
|     } | |
|   } | |
| } | |

The invention claimed is:

1. A method comprising:

decoding a first flag included in a bitstream, the first flag being associated with picture information, and the first flag having been encoded using a first Context-Based Arithmetic Coding (CABAC);

decoding a second flag included in the bitstream, the second flag being associated with the picture information, and the second flag having been encoded using a second CABAC separate from the first CABAC; and decoding at least a portion of the picture information included in the bitstream based on a coding mode indicated by the first flag or the second flag, wherein:

the first flag indicates whether or not a temporal mode is used, wherein in the temporal mode a temporal merge list is constructed that comprises only temporal motion predictor candidates; and the second flag indicates whether or not an affine prediction mode is used.

2. The method of claim 1, wherein:

the affine prediction mode indicates use of an affine motion compensation, and the temporal merge list comprises a subblock temporal motion vector prediction mode which derives motion information for subblocks of a block from motion information in a reference picture of a picture to which the block belongs.

3. The method of claim 1, wherein the temporal merge list comprises at least one of:
a subblock temporal motion vector prediction mode;
a temporal motion vector prediction mode;
a combined inter and intra prediction mode based on a temporal motion vector predictor;
a triangle prediction mode based on a temporal motion vector predictor; or
a merge motion vector difference prediction mode based on a temporal motion vector predictor.

4. The method of claim 1, wherein the temporal merge list is placed at one of the following positions in a block decoding process: as a first merge list, after a regular merge list, after an affine merge list, after a combined inter and intra prediction merge list, or after a triangle merge list.

5. The method of claim 1, wherein no temporal motion predictor candidate is included in a motion predictor candidate list other than the temporal merge list.

6. The method of claim 1, wherein decoding the second flag in a merge mode uses the same second CABAC as decoding the second flag in an inter mode.

7. The method of claim 1, wherein the first flag and the second flag are decoded at a block level of the picture information.

8. A non-transitory computer readable medium storing executable program instructions to cause a computer executing the instructions to perform a method according to claim 1.

9. The non-transitory computer readable medium of claim 8, wherein:
the affine prediction mode indicates use of an affine motion compensation, and
the temporal merge list comprises a subblock temporal motion vector prediction mode which derives motion information for subblocks of a block from motion information in a reference picture of a picture to which the block belongs.

10. A method comprising:
encoding a first flag associated with picture information, the first flag being encoded using a first Context-Based Arithmetic Coding (CABAC);
encoding a second flag associated with the picture information, the second flag being encoded using a second CABAC separate from the first CABAC; and
encoding at least a portion of the picture information based on a coding mode indicated by the first flag or the second flag to generate a bitstream, wherein:
the first flag indicates whether or not a temporal mode is used, wherein in the temporal mode a temporal merge list is constructed that comprises only temporal motion predictor candidates; and
the second flag indicates whether or not an affine prediction mode is used.

11. The method of claim 10, wherein:
the affine prediction mode indicates use of an affine motion compensation, and
the temporal merge list comprises a subblock temporal motion vector prediction mode which derives motion information for subblocks of a block from motion information in a reference picture of a picture to which the block belongs.

12. The method of claim 10, wherein the first flag and the second flag are encoded at a block level of the picture information.

13. An apparatus comprising:
one or more processors configured to:
decode a first flag included in a bitstream, the first flag being associated with picture information, and the first flag having been coded using a first Context-Based Arithmetic Coding (CABAC);
decode a second flag included in the bitstream, the second flag being associated with the picture information, and the second flag having been coded using a second CABAC separate from the first CABAC; and
decode at least a portion of the picture information included in the bitstream based on a coding mode indicated by the first flag or the second flag, wherein:
the first flag indicates whether or not a temporal mode is used, wherein in the temporal mode a temporal merge list is constructed that comprises only temporal motion predictor candidates; and
the second flag indicates whether or not an affine prediction mode is used.

14. The apparatus of claim 13, wherein:
the affine prediction mode indicates use of an affine motion compensation, and
the temporal merge list comprises a subblock temporal motion vector prediction mode which derives motion information for subblocks of a block from motion information in a reference picture of a picture to which the block belongs.

15. The apparatus of claim 13, wherein decoding the second flag in a merge mode uses the same second CABAC as decoding the second flag in an inter mode.

16. The apparatus of claim 13, wherein the first flag and the second flag are decoded at a block level of the picture information.

17. An apparatus comprising:
one or more processors configured to:
encode a first flag associated with picture information, the first flag being encoded using a first Context-Based Arithmetic Coding (CABAC);
encode a second flag associated with the picture information, the second flag being encoded using a second CABAC separate from the first CABAC; and
encode at least a portion of the picture information based on a coding mode indicated by the first flag or the second flag to generate a bitstream, wherein:
the first flag indicates whether or not a temporal mode is used, wherein in the temporal mode a temporal merge list is constructed that comprises only temporal motion predictor candidates; and
the second flag indicates whether or not an affine prediction mode is used.

18. The apparatus of claim 17, wherein:
the affine prediction mode indicates use of an affine motion compensation, and
the temporal merge list comprises a subblock temporal motion vector prediction mode which derives motion information for subblocks of a block from motion information in a reference picture of a picture to which the block belongs.

19. The apparatus of claim 17, wherein the first flag and the second flag are encoded at a block level of the picture information.

* * * * *